United States Patent [19]

Burkit

[11] Patent Number: 5,002,317
[45] Date of Patent: Mar. 26, 1991

[54] INTERNAL EXPANSION COUPLING DEVICE

[76] Inventor: John W. Burkit, P.O. Box 19, Kempton, Pa. 19529

[21] Appl. No.: 476,824

[22] Filed: Feb. 8, 1990

Related U.S. Application Data

[62] Division of Ser. No. 335,567, Apr. 10, 1989, Pat. No. 4,927,189.

[51] Int. Cl.$^5$ .............................................. F16L 41/08
[52] U.S. Cl. .................... 285/156; 285/162; 285/197
[58] Field of Search ............... 285/162, 156, 194, 196, 285/197, 338, 346, 351, 222, 109, 258, 382.4, 382.5, 158, 370, 397, 236

[56] References Cited

U.S. PATENT DOCUMENTS

| 3,141,687 | 7/1964 | Broberg et al. | 285/397 |
| 3,958,313 | 5/1976 | Rossborough | 285/230 X |
| 4,478,434 | 10/1984 | Little | 285/370 X |

FOREIGN PATENT DOCUMENTS 0317843 11/1969 Sweden ................................. 285/370

Primary Examiner—Randolph A. Reese
Assistant Examiner—David John Bartczak
Attorney, Agent, or Firm—William B. Noll

[57] ABSTRACT

This invention relates to an internal expansion coupling device for forming a T-joint between essentially perpendicularly disposed tubular members, where one of the tubular member is provided with a circular wall opening aligned with an open end of the other tubular member, and said circular wall opening includes an elastomeric collar thereabout. The device hereof comprises (a) an elongated open ended tubular joint member formed from a single, relatively rigid, rectangular sheet-like member being defined by a pair of opposing sheet ends and a pair of opposing sheet sides, where the sheet ends overlap such that the end portions thereof lie contiguous with each other;

(b) a continuous circumferentail gasket sealing sleeve formed of an elastomeric material and overlapping the sheet side of about each open end of said tubular joint member, where the sleeve, about the circumference thereof, is provided with at least one continuous upstanding rib which is adapted to be compressed against the tubular member when said device is expanded; and (c) a member accessible externally thereof for expanding said sheet-like member whereby the sheet ends move circumferentially towards one another urging one of the elastomeric sleeves and the rib thereabout against the inside wall of a tubular member, while the opposite elastomeric sleeve and rib thereabout is compressed against the elastomeric collar. A preferred aplication thereof is for use as a joint for providing acess to a storm sewer line, such as through a man-hole cover.

10 Claims, 6 Drawing Sheets

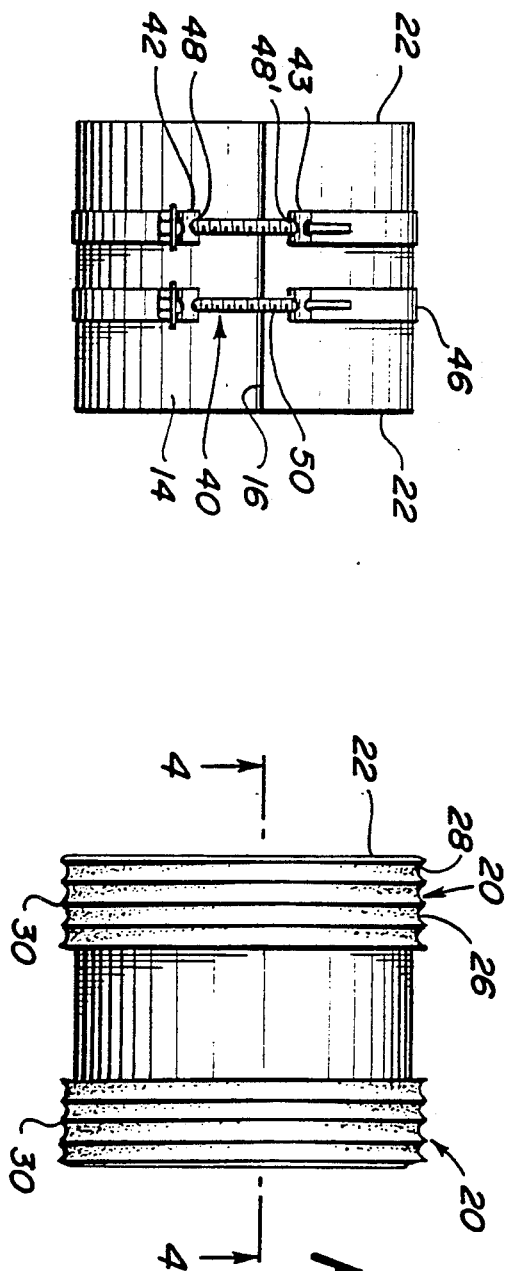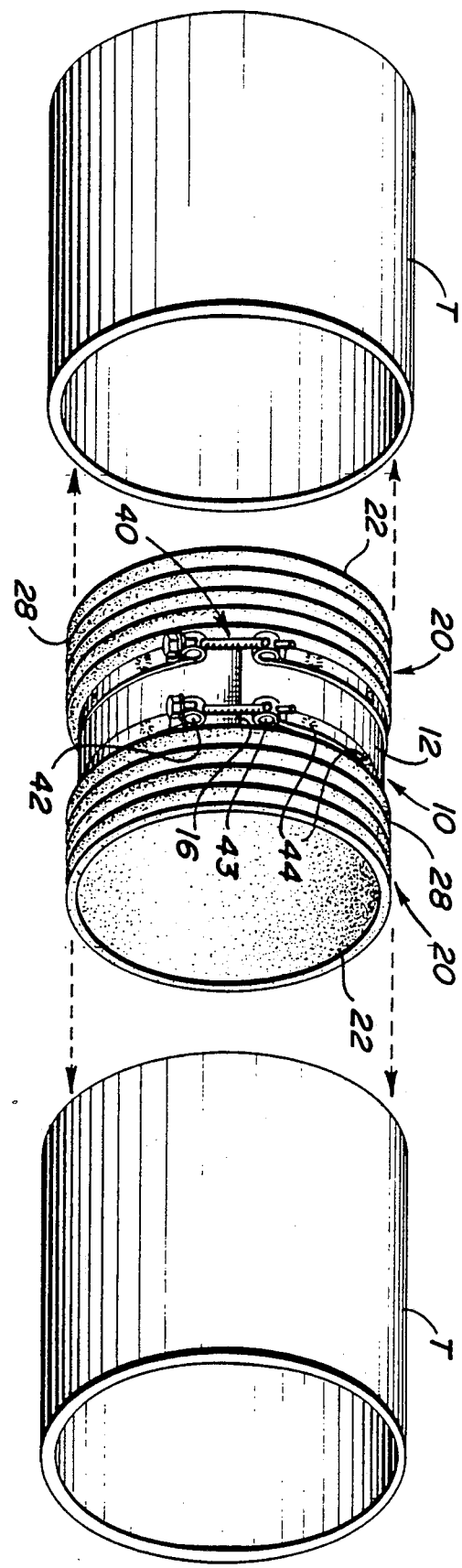

INTERNAL EXPANSION COUPLING DEVICE

RELATED APPLICATION

This application is a division of application Ser. No. 335,567, now U.S. Pat. No. 4,927,189, filed Apr. 10, 1989, by the inventor hereof.

BACKGROUND OF THE INVENTION

The present invention is directed to an internal expansion coupling device that can be joined in an essentially infiltration/exfiltration (I/E) free system, such as a pair of tubular members, where said tubular members are intended for the transmittal of a fluid medium under pressure or freeflow gravity systems.

With a very hard look now being taken with the environment, such as the numerous laws and regulations dealing with the air and clean water, the EPA is looking into the I/E rates of our nation's sewer systems. The United States has millions of miles of sound sewer pipe jointed with cement mortar or asphalt that shrinks or cracks. This and other defects allow excessive infiltration into the system, causing problems in the treatment of sewage or exfiltration in close proximity to water supply lines and streams, both I/E become a threat to the quality of our water supply.

The above represents just one need, albeit critical, where a sound and effective coupling system is essential. There are numerous other systems, such as the transmission of a fluid medium under pressure, i.e. water, oil, chemicals, where field maintenance and repair is required. Thus, a coupling system must not only be fluid tight, but relatively easy to install and/or retrofit in the field. Additionally, the coupling system hereof is particularly suitable for thin-walled pressurized fluid conduits and piping systems such as irrigation systems, water transmission systems, and various other gas and fluid transport systems. The internal expansion coupling is also suitable for heating and ventilating ducting systems.

Essentially, two types of coupling devices have been developed, external or contraction devices, and internal or expansion devices. The present invention is directed to the latter category. One problem discovered therein with such prior art devices is the difficulty of being able to force the coupling member into the tubular member to be joined, particularly with larger sized tubular members. The present invention provides a means to readily achieve this jointure, and will become more apparent in the detailed description which follows.

Notwithstanding the needs and problems noted previously, there have been attempts by the prior art to make effective internal joint connections. For example, in U.S. Pat. No. 4,478,434 to Little, there is taught a system for coupling adjacent ends of flexible tubular members comprising an elongated open ended tube member having an O.D. that is approximately the same as the I.D. of such flexible tubular members. More particularly, such system includes a transverse slit across said open ended tube member, and a pair of aligned strap-like members having opposite ends thereof connected to said tube members on opposite sides of the slit. Threadable means, as part of the strap-like members, join the opposite ends of the tube member whereby said tube may be contracted a limited amount, or expanded.

Other internal expanding coupling means are taught in U.S. Pat. No. 3,514,135 to Cooper consisting of a split sleeve having oppositely disposed inclined longitudinal flanges which may be radially moved to expand the sleeve; U.S. Pat. No. 3,141,687 to Broberg et al for a steel band splicing strap with a threaded member to separate the strap ends; U.S. Pat. No. 3,394,951 to Crivello for a polyethylene conduit insert consisting of a pair of spaced, axially extending coupling portions and a radially outwardly extending central portion. Each of the coupling portions has a substantially cylindrical internal surface and a pair of opposed frustoconical exterior surfaces tapered at approximately 2° and separated by an annular groove with the portions of the frustoconical surfaces of greatest diameter being adjacent the groove; and U.S. Pat. No. 3,269,754 to Bertling et al, a device similar in operation or function to Crivello.

Certain of the above devices are open to the objections that they create excessive internal diameter restrictions; that they are difficult to manipulate; that they require the use of special skills and or tools to connect and disconnect; that they require strict inside pipe diameter tolerances in order to form a sealed union; that they are lacking in gasket sealing integrity under field conditions; that they fail under high internal pressures; and, that they are lacking in flexibility.

The coupling device of this invention overcomes such objections. The coupling device, when in the contracted condition can be easily inserted into the pipe ends, and when in an expanded condition exhibit a minimum restriction while providing an excellent joint. The coupling can be reused in its entirety. Thus, the present invention teaches an internal expansion coupling device which is more versatile than those of the prior art, and is very effective against leaks thereof by its ability to utilize the internal forces or pressures of the medium being transmitted therethrough. This, among such other features, namely, to provide an excellent seal between adjacent pipes within a wide latitude of I.D. tolerances; to provide a coupling which maintains sealing ability under field conditions, when damage occurs to both inside and outside pipe walls, as in the form of nicks and scratches; to provide a coupling that will sustain high internal pressures while enduring both pipe and coupling deflections; to provide a coupling which will function under negative internal pressures; to provide a coupling which is economical to manufacture and inexpensive to use; to provide a coupling that is resistive to corrosive fluids; to provide a coupling which exhibits long in-service life, will become more apparent from the further description, particularly when read in conjunction with the accompanying drawings.

SUMMARY OF THE INVENTION

This invention is directed to an effective joint coupling system, more particularly to an internal expansion coupling for a tubular member. In its preferred embodiment, the system includes an elongated open ended tubular member formed of a relatively rigid sheet-like member, such as steel sheet, where the sheet ends overlap such that the end portions lie contiguous with each other. A continuous sleeve, formed of an elastomeric material overlaps the sheet side about at least one open end of said tubular member. The sleeve, about the circumference thereof, is provided with at least one continuous upstanding rib, i.e. scalloped, which is adapted to lie adjacent to and be compressed against the inside wall of the tubular member. Finally, means are provided for expanding said sheet-like member whereby said sheet ends move circumferentially towards one another urging said elastomeric sleeve and said rib against the inside wall of the tubular member. The added pressure from the flowing medium therethrough only serves to enhance the coupling joint.

BRIEF DESCRIPTION OF THE DRAWINGS

FIG. 1 is an exploded perspective view of a preferred internal expansion coupling according to this invention, showing such device in a position relative to a pair of open-ended tubular members to be coupled.

FIG. 2 is a plan view of the coupling device of FIG. 1, without the expansion/contraction mechanism.

FIG. 3 is a plan view of the coupling device of FIG. 1, without the elastomeric sleeve, as taught herein.

DETAILED DESCRIPTION OF PREFERRED EMBODIMENT

Figure 7:
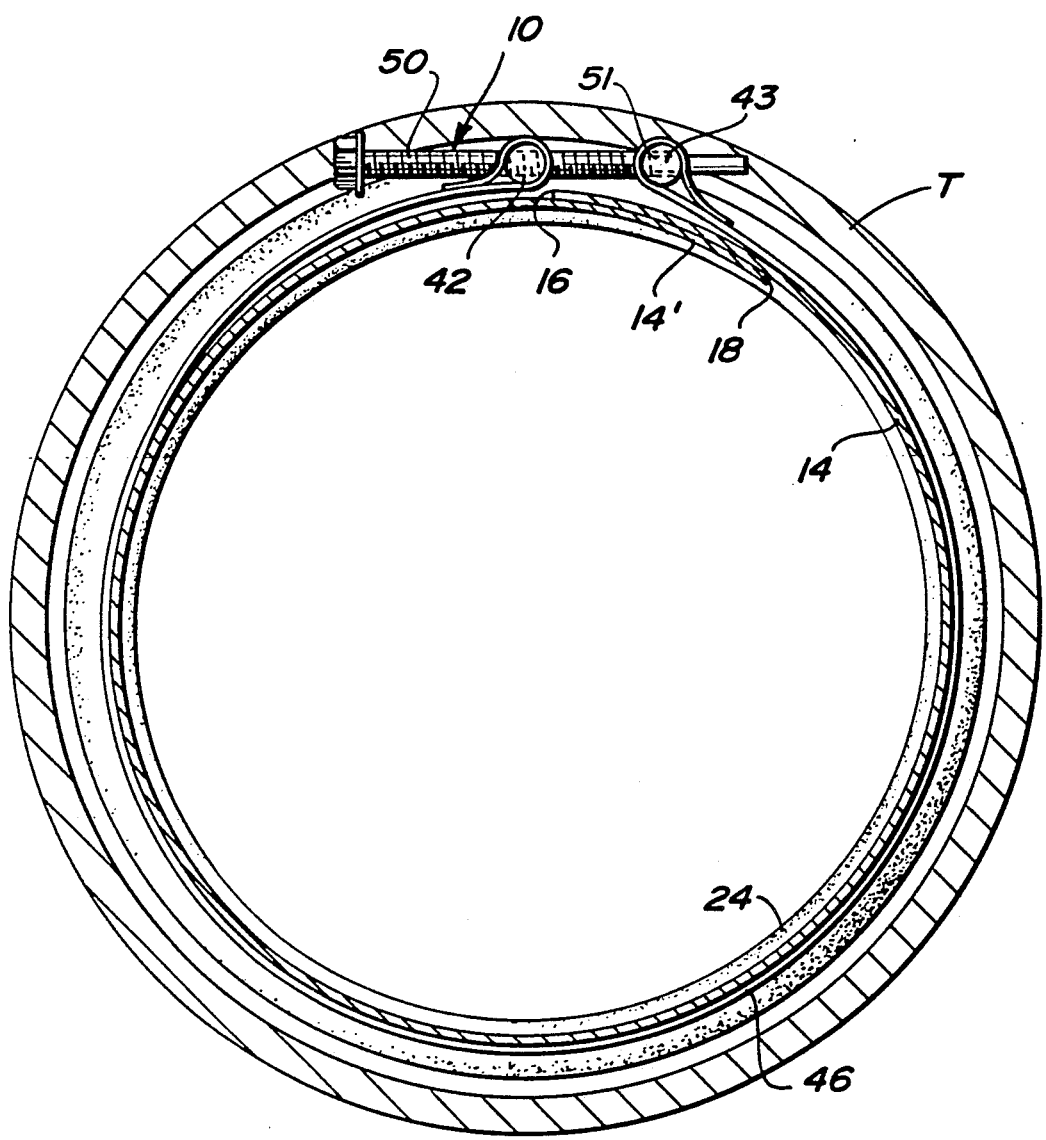
FIG. 7 is an enlarged sectional view taken through a coupling device according to this invention, showing a contracted condition thereof to facilitate its entry into an open-ended tubular member.
Figure 8:
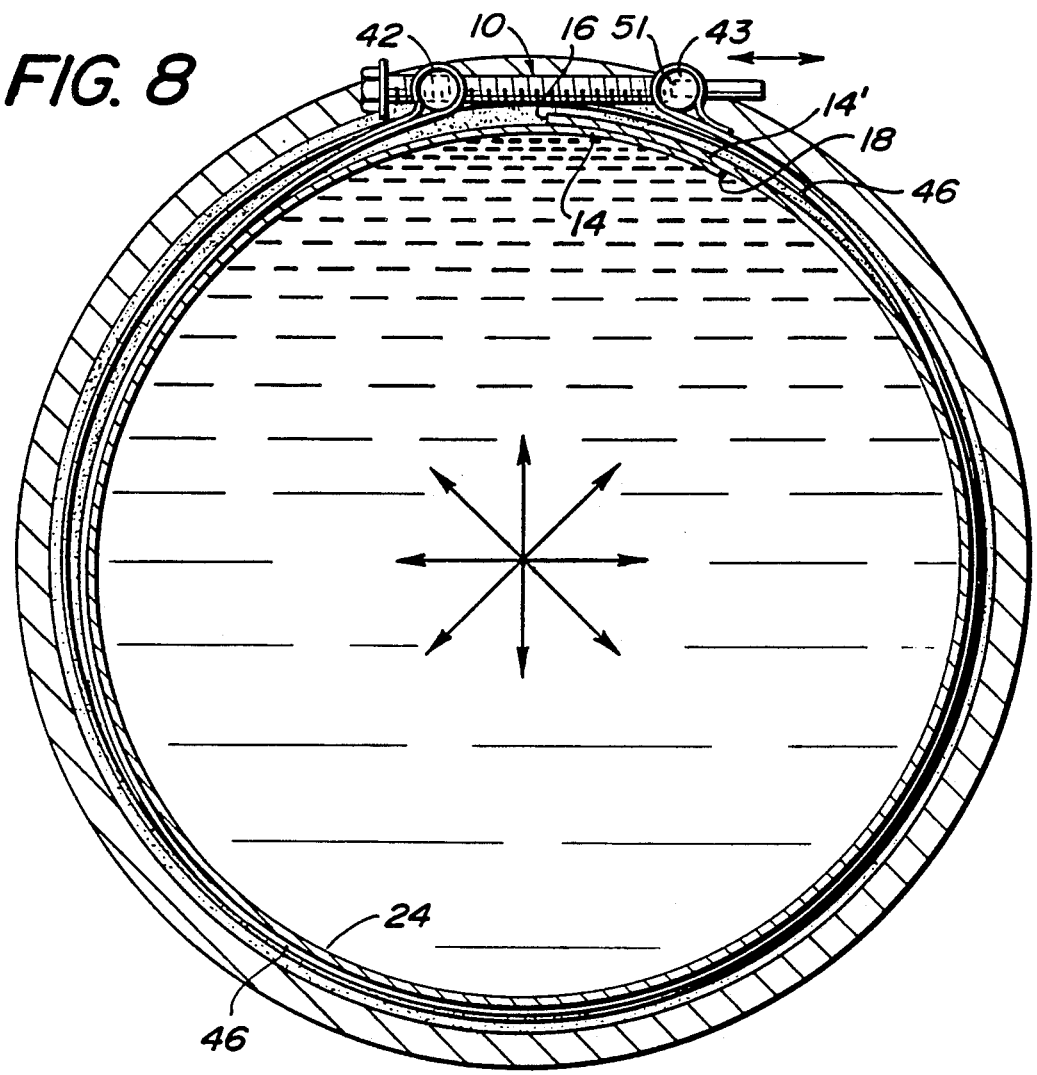
FIG. 8 is an enlarged sectional view, similar to FIG. 7, showing an expanded condition for the coupling device hereof in an operating condition.

The present invention relates to an internal expansion coupling for a tubular member, such as for joining a pair of aligned, end-to-end tubular members or pipes (T), as illustrated in FIGS. 1–3. The preferred coupling device 10 of this invention comprises an open-ended tubular member or expanding sleeve 12 formed from a relatively rigid sheet-like material, such as plastic, composite material, or metal, i.e. stainless or coated plain carbon steel, into a cylindrical configuration where the sheet ends 14,14' overlap (FIGS. 7 and 8) and lie contiguous with one another. From the latter Figures in particular, it will be understood that the sheet edges 16,18, in a relaxed state are a predetermined circumferential distance apart. As shown by FIG. 7, the coupling 10 is reduced in size by further sliding the ends 14,14' relative to one another so as to increase the circumferential distance between edges 16 and 18. However, as seen in FIG. 8, the edges 16,18 are brought closer together with the resulting expansion of the coupling 10. This facet of the invention will become clearer hereinafter.

The effective seal achieved by the coupling device 10 of this invention is found in the use of a continuous gasket sleeve 20 about the open ends 22 of coupling device 10. While each such sleeve 20 wraps around its corresponding end 22, such that the cross-section thereof is U-shaped, it is desirable to connect the inner arms, as shown by reference numeral 24 (FIG. 4), to essentially lie contiguous with the inner wall of tubular member 12. The sleeve is formed of an elastomeric material, such as high quality rubber, or the like. Further, the sleeve, particularly that inner portion identified by reference numeral 24, may be provided with circumferentially disposed high strength wires within the sleeve to provide hoop support or strength. The preferred manner would be to place such wires in the sleeve during the molding operation. The outer portion 26 is provided along the surface 28 thereof with rib 30, or scalloped, such as by plural ribs. Preferably, such ribs 30 are pointed, or knife-edged, so as to readily yield and seal upon expansion of tubular member 12. As by procedures known in the art, the gasket sleeve 22 may be extruded into an endless length, i.e. continuous, and cut to discrete lengths for use herein. The ends thereof may then be vulcanized or joined by a suitable adhesive to form a continuous cylindrical shape. Additionally, it is contemplated by this invention that a bond may be provided between the inner wall 27 (FIG. 4) and the expanding sleeve 12, where bonding thereof may be effected by vulcanization. A plyable sealant material may also be included between overlapping sheet ends 14,14'. This can be particularly suitable for a negative pressure system.

Figure 4:
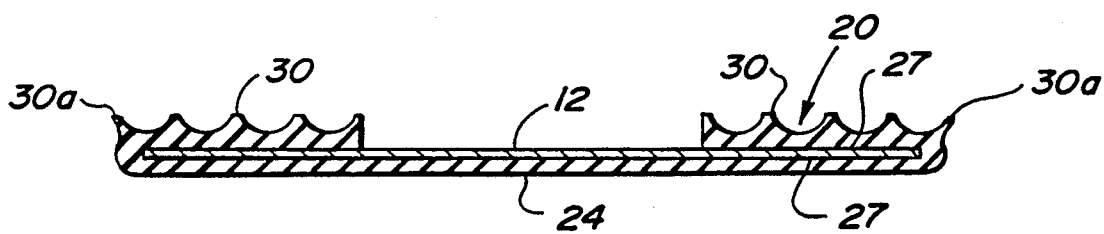
FIG. 4 is a partial sectional view taken along line 4—4 of FIG. 2.

In the preferred embodiment, as best seen in FIG. 4, the outermost ribs 30a are angled outwardly, approximately at a 60° angle relative to the plane of tubular member 12. The inner knife-edged ribs are essentially perpendicular relative to such member 12. The outwardly projecting knife-edged ribs skirt downwardly when compressed against the inner wall of the joined tubular member, to provide the coupling with initial sealability. However, it is not only by this means that the coupling becomes an effective sealer. In conjunction with the initial sealing effort on the part of the outermost projecting knife-edged ribs, internal pressure is permitted to build, thus exerting significantly more internal force on the tubular expanding member 12, thereby causing the unrestrained expanding member 12 to expand even further, as shown by the "arrows" in FIG. 8. In turn, all the circumferential or inner knife-edged peaks are compressed even further, thereby forming an increasingly tighter seal.

Figure 5:
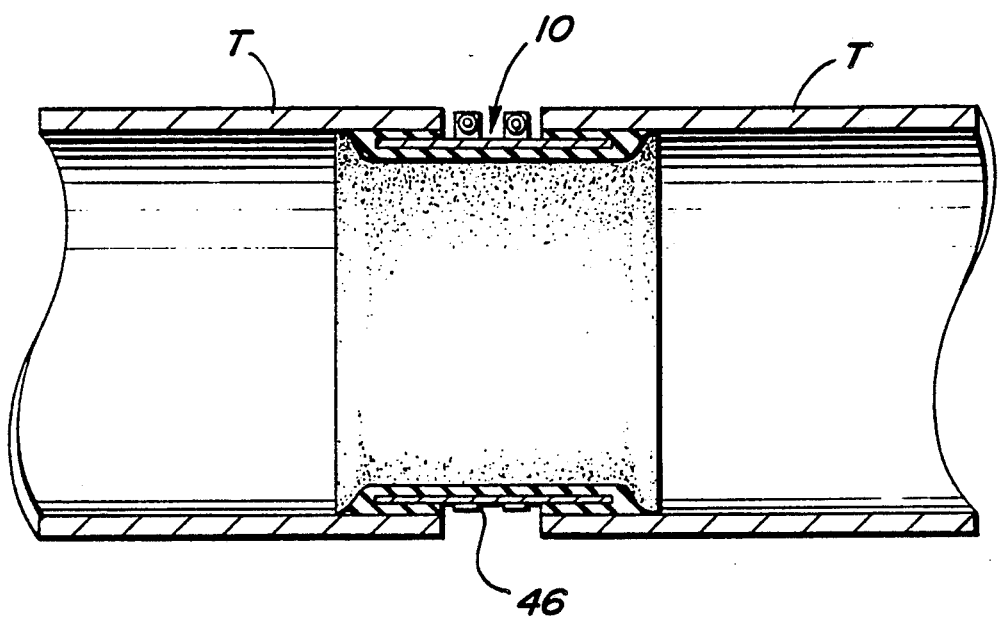
FIG. 5 is a partial sectional view of the coupled and assembled tubular members of FIG. 1, taken in an axial direction.
Figure 6:
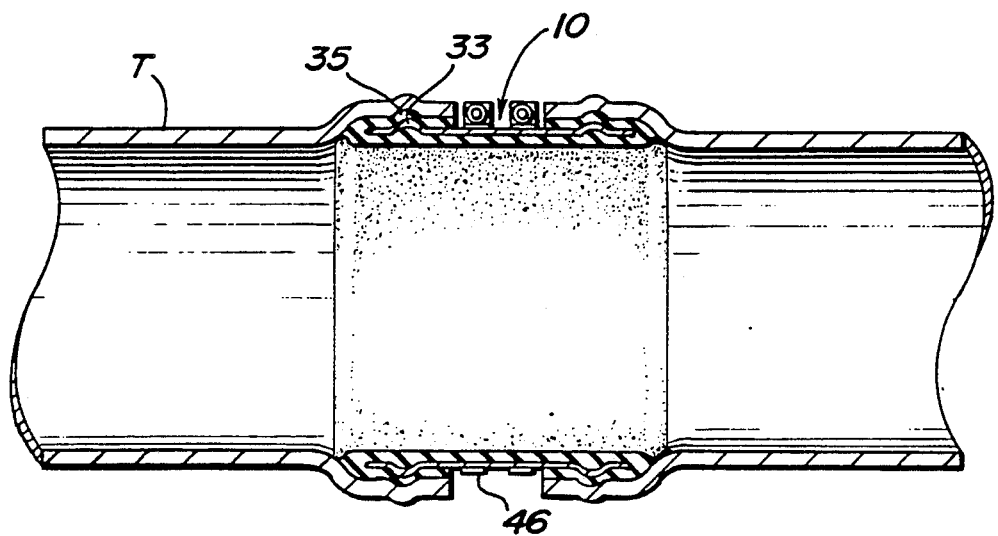
FIG. 6 is a partial sectional view, similar to FIG. 5, showing the use of the coupling device hereof to join tubular members having a bell-shaped end configuration.

FIGS. 5 and 6 illustrate the preferred manner of joining two tubular members (T) aligned in end-to-end relationship. Specifically, FIG. 5 shows two smooth-lined pipes, where FIG. 6 shows the manner two bell-ended pipes may be joined. The latter is particularly advantageous where it is important to avoid turbulence in the flow of fluid medium therethrough.

FIG. 6 illustrates a further embodiment contemplated by this invention, and that is the provision of an annular rib or bead 33 formed or rolled into expanding sleeve 12. To the extent that such bead 33 is formed in an annular position within the gasket sleeve 20, such gasket sleeve may be molded to accommodate the rib or bead 33. Whether formed on the expanding sleeve 12 within or outside the gasket sleeve 20, it is preferable to align the bead 33 with a complementary annular inside channel 35 about the pipe or tubular member T. Additionally, in service, axial loads have been experienced which can cause tubular members to yield resulting in an ineffective joint. With the arrangement proposed herein, thrust restraint is achieved.

As noted previously, one of the unique features of this invention is the ready ability to contract and expand as desired. To effect the expansion thereof the coupling device is provided with means to cause the sheet edges 16 and 18 to slidably move toward one another whereby the circumferential expanse of the tubular member 12 increases. One such means is illustrated in FIGS. 1 and 3, while the operation thereof is best understood from FIGS. 7 and 8. A preferred means to effect expansion is by the use of a threaded member spanning the overlapped ends 14,14'. The expansion mechanism 40 may comprise a first threaded rod 42 secured to end 14, for example, and axially aligned with regard to the tubular expansion member 12. A similar rod 43 is secured to end 14'. In the alternative, such rods 42,43 may be connected by means of a strap 46, such as a steel strip, encircling the tubular member 12 in the opposite direction. In either event, each opposing pair of rods, two such pairs being shown in FIGS. 1 and 3, is provided with aligned holes 48,48'. However, holes 48 are threaded to receive fastening means or bolt 50, while holes 48' are unthreaded to receive the end portion 51 of bolt 50. It will be noted that as bolt 50 is turned, the threaded rod 42 is caused to move relative to rod 43, whereby expansion or contraction of the coupling device will be observed.

Figure 9:
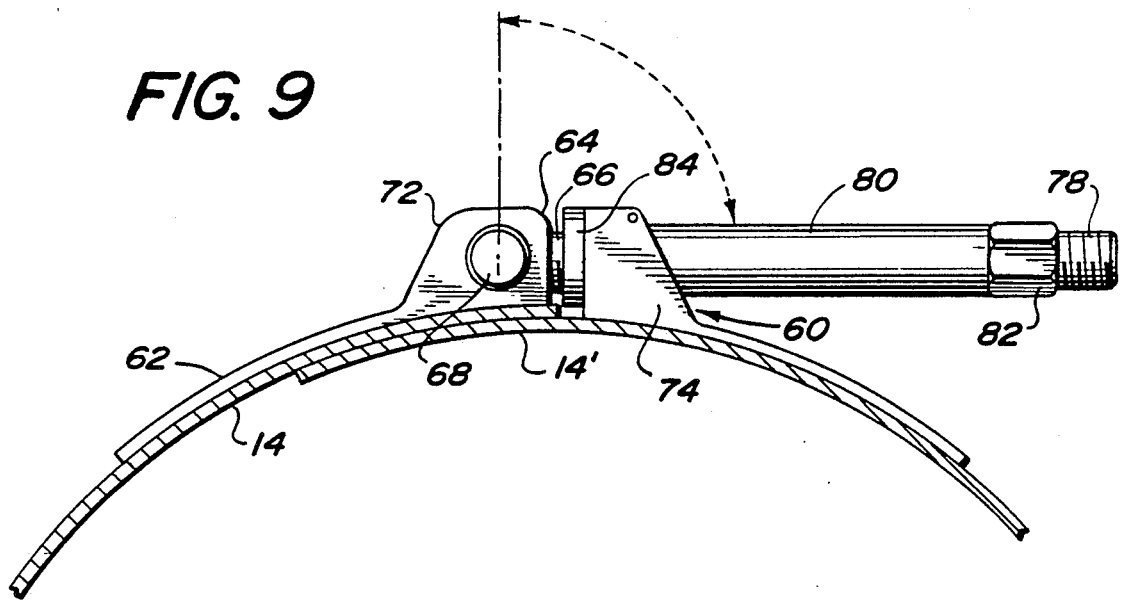
FIG. 9 is a partial plan view of an alternative embodiment of the mechanism to effect expansion and contraction of the coupling device of this invention.
Figure 10A:
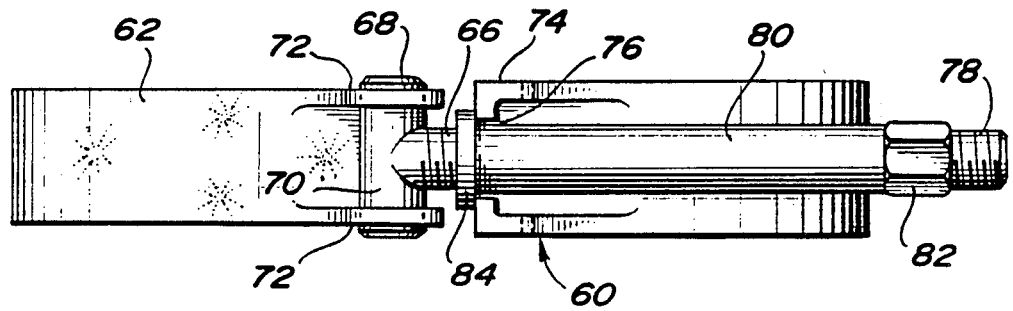
FIGS. 10A and 10B are top views of the alternative embodiment of FIG. 9, showing respectively, the manner of use thereof to effect expansion and contraction of the coupling device.
Figure 10B:
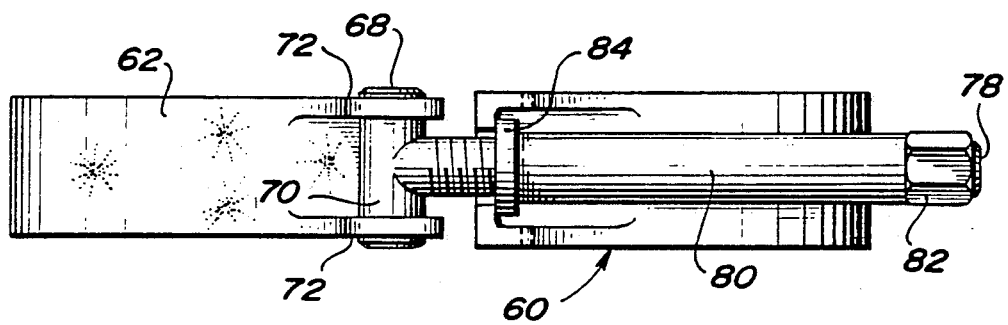

An alternative mechanism to effect expansion and contraction of the coupling device of this invention is illustrated in FIGS. 9, 10A and 10B. Such mechanism 60, comprises a first member 62 fixed to, for example, the outer surface of sheet end 14, such as by welding, having at one end 64 a threaded T-bar 66 arranged for pivoting 68 from an engaged (horizontal) position to a disengaged (vertical) position, see FIG. 9. Specifically, the circular top bar or sleeve 70 is journaled for pivoting action in upstanding wings 72.

Affixed to the other sheet end 14' is a U-shaped member 74 where the opening 76 is sufficient to receive threaded rod 78 and elongated flanged nut 80, the remote end 82 of which is adapted to be turned by a hand tool, well known in the art. Additionally, a flange 84 is utilized by positioning same to effect expansion of the coupling device 10 (FIG. 10A) or contraction (FIG. 10B). Note that the flange is placed before the U-shaped member 74 for expansion, or behind such member for contraction.

Figure 11:
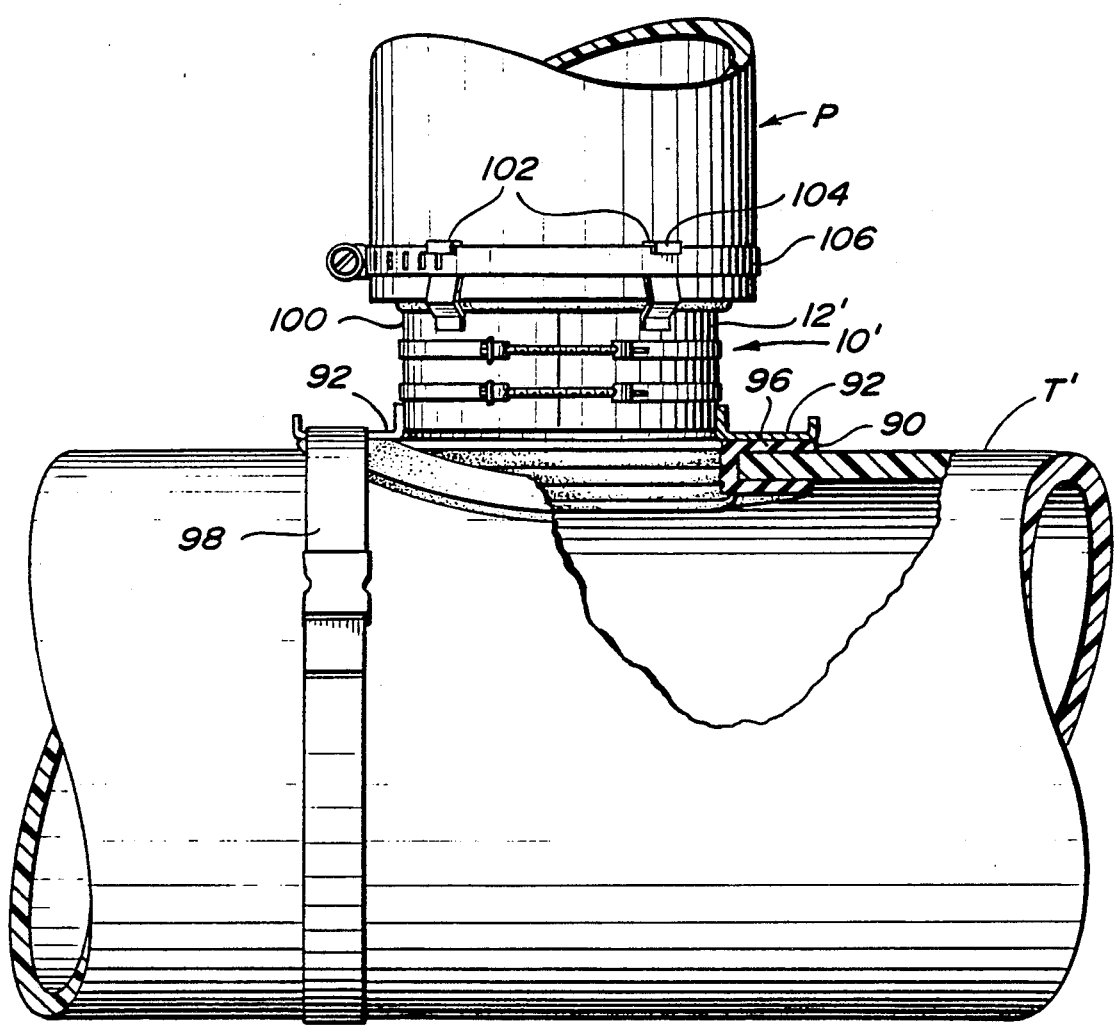
FIG. 11 is a plan view, partially in section to show certain details, of the coupling device according to this invention, where a T-joint is formed between two tubular members.

FIG. 11 is a partial sectional view illustrating the use of the coupling device hereof to effect a T-joint between two tubular members (P,T'). This system, for example, may be the type utilized to retrofit an in-field joint for an existing tubular member. For this embodiment, a hole is cut into the tubular member T' where the new line, T-joint, or manhole tap is to be provided. Around said hole there is provided an elastomeric collar 90. The coupling device 10, is inserted into the opening defined by collar 90, to be expanded in the manner described above. For added stability, a pair of U-shaped channels 92, where one end of each is affixed to one end of the expanding sleeve 12' and the base thereof lies contiguous with the outside portion 96 of collar 90. By this arrangement, an encircling restraining strap 98 may be applied to stabilize the coupling device 10' to the tubular member T'. At the opposite end 100 of expanding sleeve 12', plural Z-shaped members 102 may be added to provide means for fixing the axial position of the added pipe P, and to provide a retention means 104 for encircling strap 106. By this means, the end of pipe P is under a compressive force by the expanding pressure of coupling device 10', coupled with the contracting force of strap 106.

I claim:

1. An internal expansion coupling device for forming a T-joint between essentially perpendicularly disposed tubular members, where one said tubular member is provided with a circular wall opening aligned with an open end of the other tubular member, and said circular wall opening includes an elastomeric collar thereabout, said device comprising
    (a) an elongated open ended tubular joint member formed from a single, relatively rigid, rectangular sheet-like member, said member being defined by a pair of opposing sheet ends and a pair of opposing sheet sides, where the sheet ends overlap such that the end portions thereof lie contiguous with each other;
    (b) a continuous circumferential gasket sealing sleeve formed of an elastomeric material and overlapping the sheet side about each open end of said tubular joint member, where said sleeve, about the circumference thereof, is provided with at least one continuous upstanding rib which is adapted to be compressed against said tubular member when said device is expanded; and
    (c) means accessible externally thereof for expanding said sheet-like member whereby said sheet ends move circumferentially towards one another urging one of said elastomeric sleeves and the rib thereabout against the inside wall of a tubular member, while the opposite elastomeric sleeve and rib thereabout is compressed against said elastomeric collar.

2. The internal expansion coupling device as claimed in claim 1 wherein auxiliary means are provided to secure each said tubular member to said device.

3. The internal expansion coupling device as claimed in claim 2 wherein said auxiliary means includes restraining straps encircling said tubular members.

4. The internal expansion coupling device as claimed in claim 1 wherein said continuous circumferential gasket sealing sleeves are joined internally with one another.

5. The internal expansion coupling device as claimed in claim 1 wherein each continuous circumferential gasket sealing sleeve is provided with plural circumferential ribs.

6. The internal expansion coupling device as claimed in claim 5 wherein the outer rib of each said continuous circumferential gasket sealing sleeve is angled outwardly and that each internal rib projects substantially perpendicularly to said sleeve.

7. The internal expansion coupling device as claimed in claim 1 wherein said elastomeric collar in the wall of one of said tubular members is adapted to lie contiguous to one of said circumferential gasket sealing sleeves.

8. The internal expansion coupling device as claimed in claim 7 wherein a pair of strap retention members are provided adjacent said elastomeric collar.

9. The internal expansion coupling device as claimed in claim 8 wherein said strap retention members are affixed near one end of said elongated open ended tubular joint member.

10. The internal expansion coupling device as claimed in claim 9 wherein stabilizing means are provided near the opposite end of said elongated open ended tubular joint member.

* * * * *